(12) United States Patent
Yang

(10) Patent No.: US 8,388,128 B2
(45) Date of Patent: Mar. 5, 2013

(54) ADJUSTABLE EYEGLASSES ASSEMBLY

(75) Inventor: Shun-Tien Yang, Tainan (TW)

(73) Assignee: All-Logic Int. Co., Ltd., Tainan (TW)

( * ) Notice: Subject to any disclaimer, the term of this patent is extended or adjusted under 35 U.S.C. 154(b) by 58 days.

(21) Appl. No.: 13/220,076

(22) Filed: Aug. 29, 2011

(65) Prior Publication Data

US 2012/0050665 A1    Mar. 1, 2012

(30) Foreign Application Priority Data

Aug. 30, 2010    (TW) ................. 99216742 U

(51) Int. Cl.
*G02C 5/14*        (2006.01)
(52) U.S. Cl. ........................ 351/121; 351/114
(58) Field of Classification Search .................. 351/111, 351/114, 119, 121
See application file for complete search history.

(56) References Cited

U.S. PATENT DOCUMENTS 7,845,793 B1 *  12/2010 Tsai ............................ 351/118
2011/0080556 A1 *  4/2011 Yee et al. ..................... 351/114

* cited by examiner

*Primary Examiner* — Huy K Mai
(74) *Attorney, Agent, or Firm* — Marger, Johnson & McCollom PC

(57)    ABSTRACT

An adjustable eyeglasses assembly includes an eyeglasses frame, two temples and two rotary adjuster elements. The eyeglasses frame has two opposite temple connecting parts, each having an abutment face. Each temple has a pivot part connected foldably to one of the temple connecting parts, an ear piece, and a recess formed between the pivot part and the ear piece. Each adjuster element is disposed rotatably in the corresponding recess, has first and second end faces, and is rotatable to selectively move one of the first and second end faces to abut against the abutment face and to thereby limit a turning angle of the corresponding temple when the temple is unfolded, and the turning angle is changed when the first and second end faces are interchanged for abutment with the abutment face.

7 Claims, 5 Drawing Sheets

ADJUSTABLE EYEGLASSES ASSEMBLY

CROSS-REFERENCE TO RELATED APPLICATION

This application claims priority of Taiwan Patent Application No. 99216742, filed on Aug. 30, 2010.

BACKGROUND OF THE INVENTION

1. Field of the Invention

The invention relates to eyeglasses, more particularly to eyeglasses that have a pair of temples provided with adjustable turning angles.

2. Description of the Related Art

A pair of ordinary eyeglasses usually include an eyeglasses frame, a pair of lenses mounted on the eyeglasses frame, and a pair of temples each connected pivotably to a respective lateral side of the eyeglasses frame. When not in use, the temples can be folded toward the eyeglasses frame for convenience in storage, and in use, the temples can be expanded in opposite directions. Although a pair of ordinary eyeglasses usually provide some functions, such as, convenience in storage and easy expansion for wearing, the distance between the expanded temples is fixed and is non-adjustable. Therefore, when the distance between the expanded temples is too small, the temples tend to press the cheeks of the wearer, causing discomfort to the wearer. If the distance between the expanded temples is too large, then the eyeglasses are likely to become loosened causing inconveniences to the wearer. Moreover, when a user wants to purchase a pair of eyeglasses, it will be necessary to take time for choosing suitable temples among others, or to acquire the desired temples through customization, which can waste time and money.

SUMMARY OF THE INVENTION

Therefore, an object of the present invention is to provide an eyeglasses assembly with temples, whose largest turning angles can be adjusted to suit comfortably different sizes of users' heads.

Accordingly, an eyeglasses assembly of this invention comprise: an eyeglasses frame, two temples and two rotary adjuster elements. The eyeglasses frame has two opposite temple connecting parts, each having an abutment face. Each of the temples has a pivot part connected foldably to one of the temple connecting parts, an ear piece, and a recess formed between the pivot part and the ear piece and adjacent to the abutment face. Each of the adjuster elements is disposed rotatably in the recess of one of the temples, and has first and second end faces that are opposite to each other. Each of the adjuster elements is rotatable to selectively move one of the first and second end faces to abut against the abutment face and to thereby limit a turning angle of a respective one of the temples when the respective one of the temples is unfolded, and the turning angle is changed when the first and second end faces are interchanged to abut against the abutment face.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
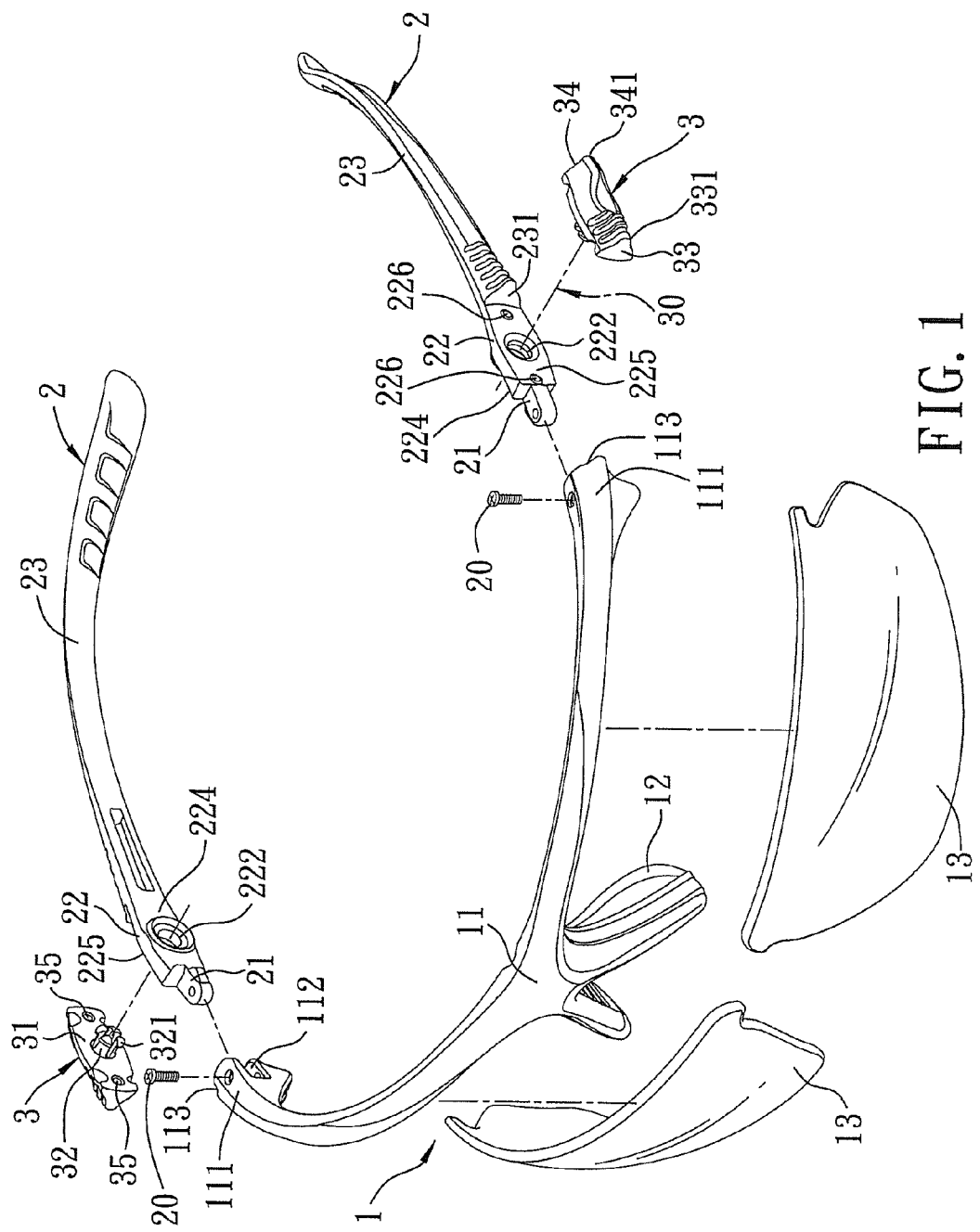
FIG. 1 is an exploded perspective view of the preferred embodiment of an adjustable eyeglasses assembly according to the present invention.
Figure 2:
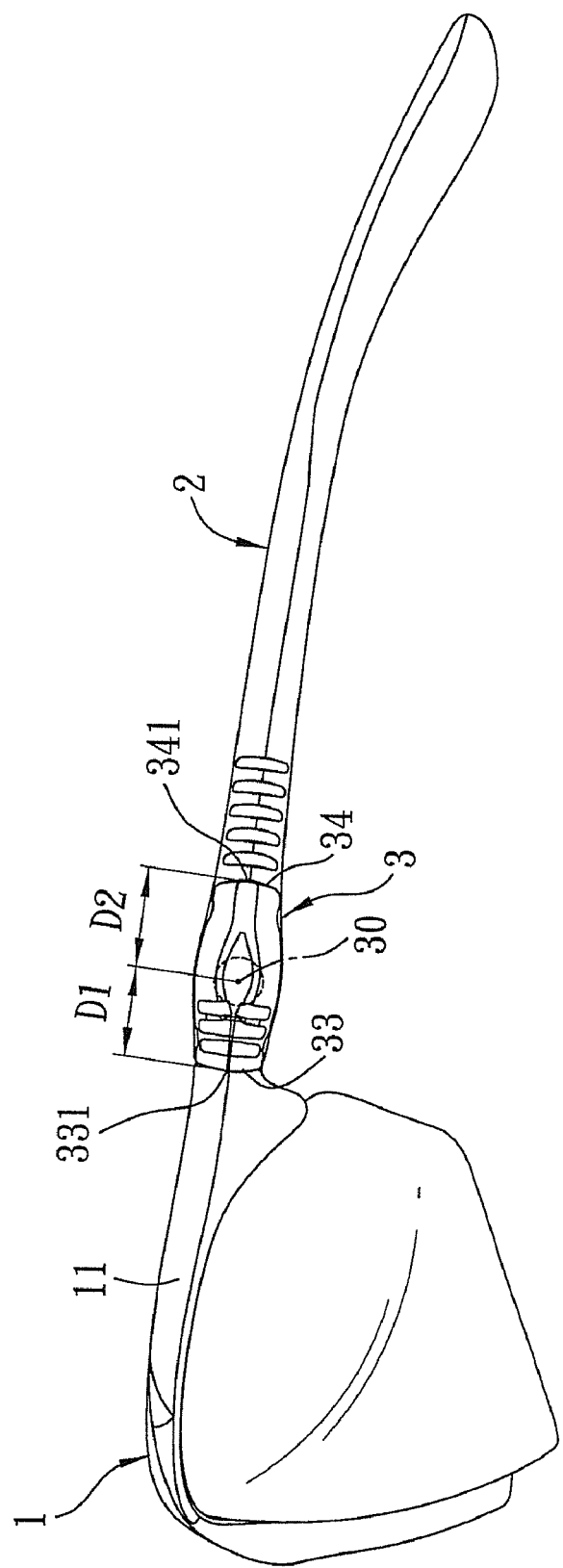
FIG. 2 is a side elevation view of the preferred embodiment.
Figure 3:
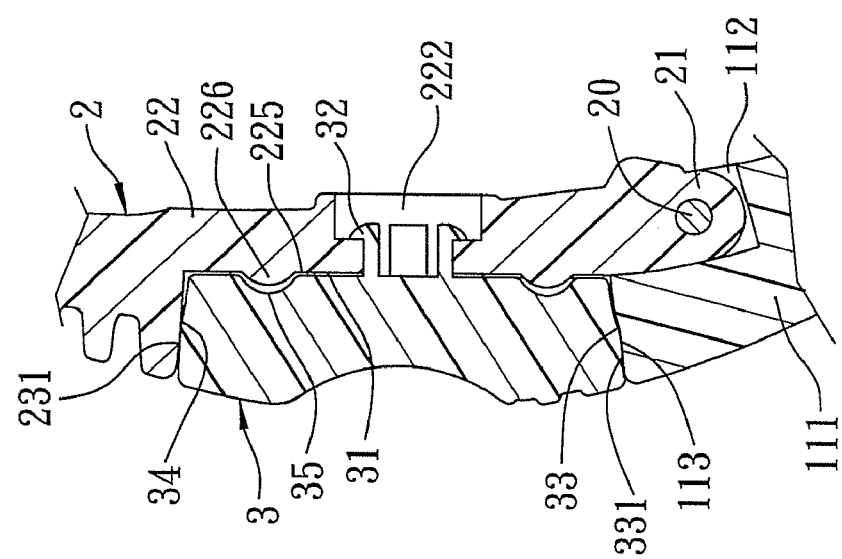
FIG. 3 is an enlarged fragmentary sectional view for illustrating temples that are unfolded to a first expanded position.

As shown in FIGS. 1 to 3, the preferred embodiment of an adjustable eyeglasses assembly according to the present invention comprises an eyeglasses frame unit 1, two temples 2 and two rotary adjuster elements 3. The eyeglasses frame unit 1 in this embodiment includes an eyeglasses frame 11, a nose pad 12 protruding downward from a center of the eyeglasses frame 11, and two opposite temple connecting parts 111. A pair of lenses 13 are mounted to the eyeglasses frame 11 on two sides of the nose pad 12. Each temple connecting part 111 is formed with a pivot connection notch 112 and an abutment face 113 facing rearward. While the eyeglasses frame 11 in this embodiment is a half-rim frame as shown in FIG. 1, the present invention should not be limited to the embodiment, and the eyeglasses frame 11 may be configured as a rimless frame or a full-rim frame.

Each of the temples 2 includes a pivot part 21 that is connected foldably to the corresponding one of the temple connecting parts 111 by inserting the pivot part 21 into the pivot connection notch 112 and by using a threaded pivot pin 20. Each temple 2 further includes an ear piece 23 for hanging over one ear of the wearer, a recess 22 formed between the pivot part 21 and the ear piece 23 and adjacent to the abutment face 113, an inner side 224 adapted to contact a user' s head, an outer side 223 that is opposite to the inner side 224 and that is recessed to form a recess bottom 225 and a recess sidewall 231, a pivot hole 222 extending through the inner side 224 and the recess bottom 225, and two locking pieces 226 protruding from the recess bottom 225 on two opposite sides of the pivot hole 222. Each recess 22 opens at one side adjacent to the abutment face 113 of the eyeglass frame 11. The recess bottom 225 and the recess sidewall 231 cooperatively define the recess 22, and the recess sidewall 231 confronts with the abutment face 113 of the eyeglasses frame 11. The threaded pivot pin 20 defines a pivot axis of the pivot part 21.

Each of the adjuster elements 3 is disposed rotatably in the recess 22 and between the recess sidewall 231 and the abutment face 113, and includes a contact face 31 to contact the recess bottom 225 of one of the temples 2, a spindle 32 that projects into the pivot hole 222 from the contact face 31, and first and second end faces 33, 34 that are disposed on two opposite sides of the spindle 32. The spindle 32 includes a plurality of radially and resiliently protruding hooks 321 to rotatably engage the pivot hole 222. The adjuster element 3 further includes two locking slots 35 to releasably and respectively interlock with the locking pieces 226 in the corresponding one of the recesses 22.

Each adjuster element 3 is rotatable to selectively move one of the first and second end faces 33, 34 to abut against the abutment face 113 and to thereby limit a turning angle of the corresponding temple 2 when the temple 2 is fully unfolded. The turning angle of the temple 2 is changed when the adjuster element 3 is pivoted about the axis 30 of the spindle 32 to interchange the positions of the first and second end faces 33, 34 for abutment with the abutment face 113. The first end face 33 has a first abutment part 331 to abut against the abutment face 113, and the second end face 34 has a second abutment part 341 to abut against the abutment face 113. The first and second end faces 33, 34 are arranged such that a shortest distance (D1) of the first abutment part 331 from the axis 30 of the spindle 32 is larger than that (D2) of the second abutment part 341 from the axis 30. For example, in this embodiment, D1=9.74 mm, and D2=9.89 mm.

Figure 5:
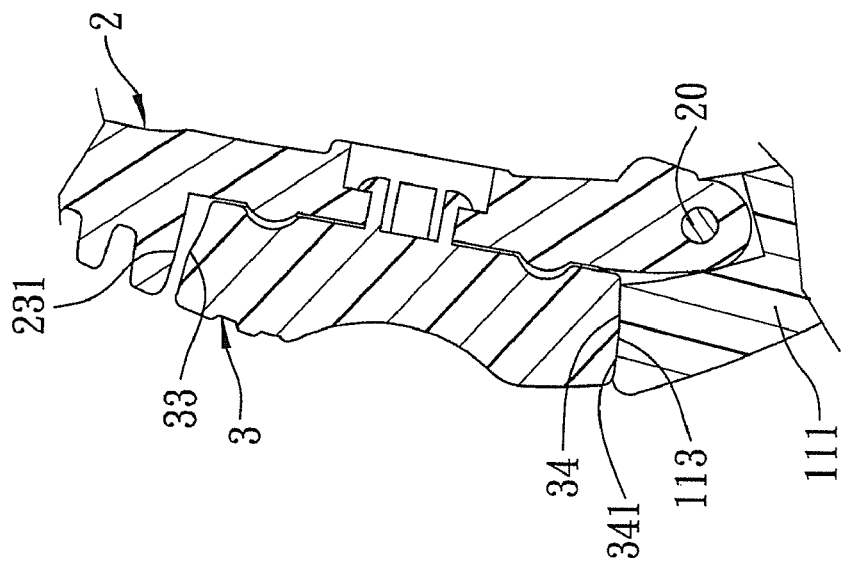
FIG. 5 is the same view as FIG. 3 but showing that the temples are in a second expanded position.
Figure 4:
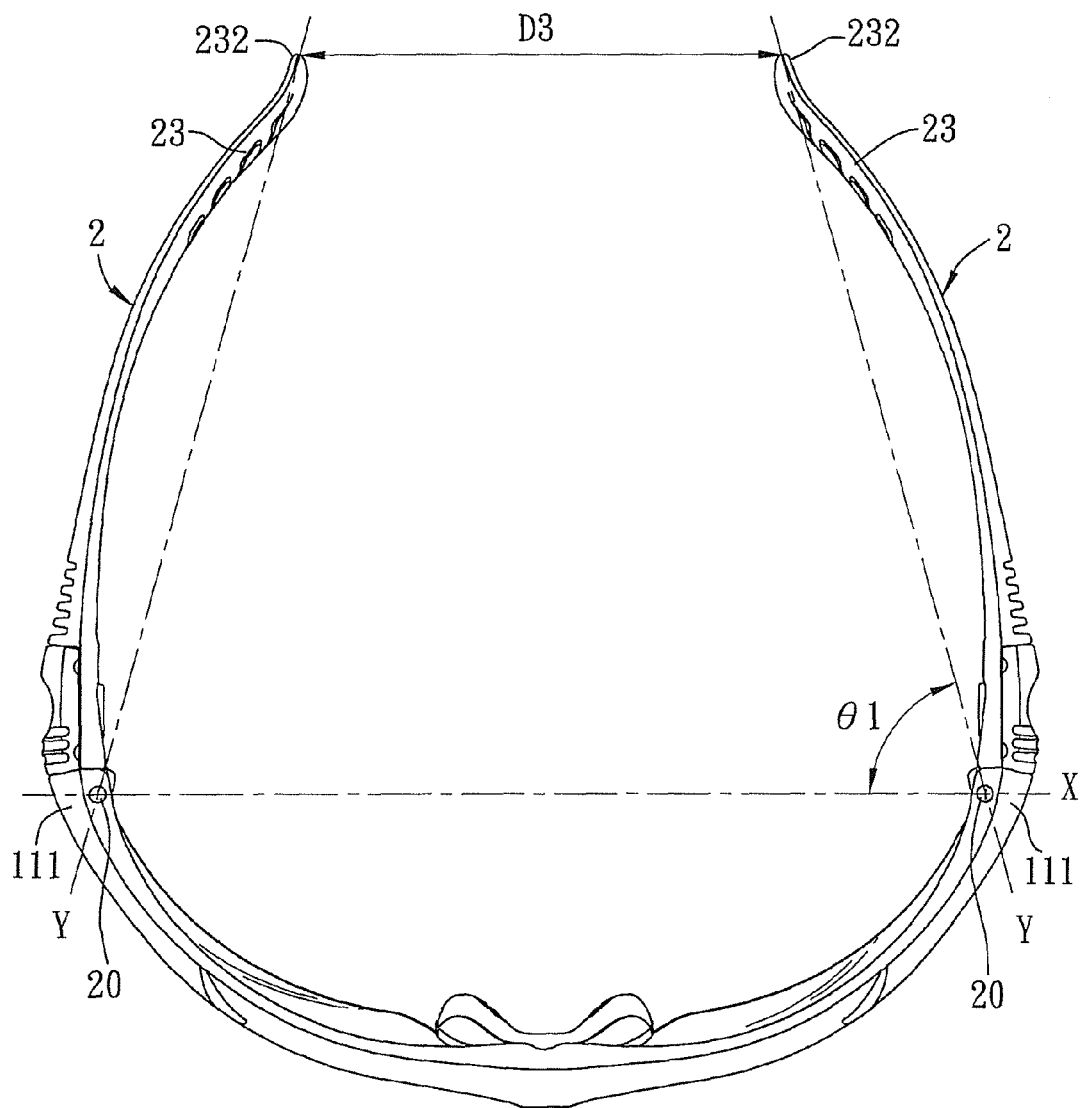
FIG. 4 is a top plan view of the preferred embodiment wherein the temples are their first expanded positions.
Figure 6:
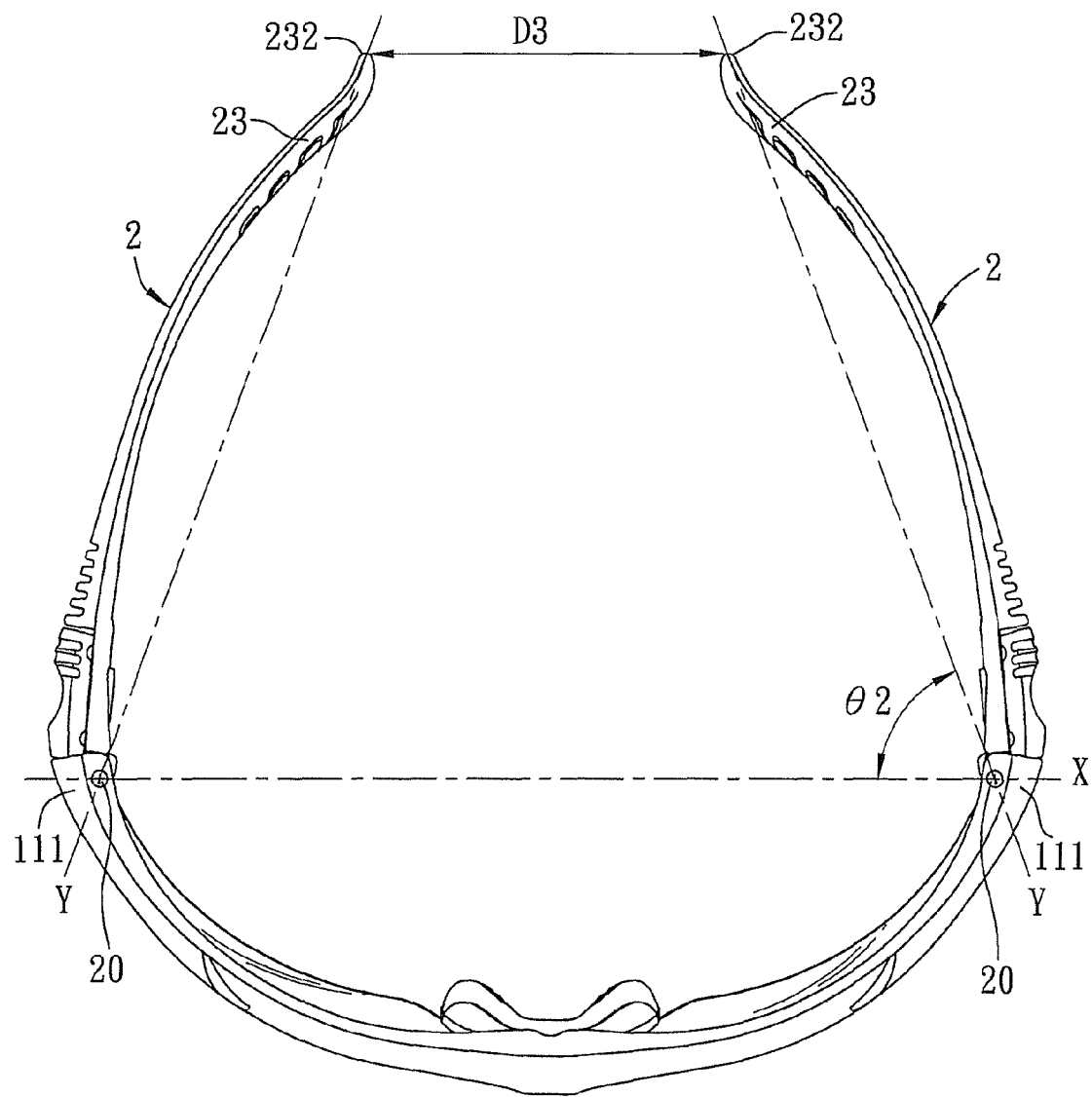
FIG. 6 is the same view as FIG. 4 but showing that the temples are unfolded to the second expanded position.

Referring to FIGS. 2 to 4, the temples 2 are turned to their first expanded position, the spindles 32 of the adjuster elements 3 engage the respective pivot holes 222, the locking pieces 226 interlock with the respective locking slots 35, and the first abutment parts 331 of the first end faces 33 abut against the respective abutment faces 113. An imaginary line (X) passes through the pivot axes 20 of the pivot parts 21. The ear pieces 23 of the temples 2 have terminating ends 232. Each of two imaginary lines (Y) passes through one of the terminating ends 232 and the corresponding pivot axis 20. Each imaginary line (Y) is inclined by an angle (θ1) with respective to the imaginary line (X). The angle (θ1) is the largest turning angle of each temple 2 when the temples 2 are fully unfolded to the first expanded position. Referring to FIGS. 2, 5 and 6, the largest turning angle is changed from (θ1) to (θ2) to adjust the expanded positions of the temples 2. When it is desired to adjust the largest turning angles of the temples 2, the temples 2 may be rotated slightly inward from their first expanded positions so that the first end faces 33 of the adjuster elements 3 are disengaged from the abutment faces 113. Afterwards, the adjuster elements 3 may be rotated about by 180 degrees, followed by turning the temples 2 outward so that the second abutment parts 341 of the second end faces 34 abut against the respective abutment faces 113. In such a manner, the temples 2 may be changed from the first expanded position as shown in FIGS. 3 and 4 to the second expanded position shown in FIGS. 5 and 6.

Referring back to FIG. 2, since the distance (D2) is larger than the distance (D1), when the second abutment parts 341 of the second end faces 34 abut against the respective abutment faces 113, the largest turning angles of the temples 2 are reduced. That is to say, in the second expanded position, the angle (θ2) is smaller than the angle (θ1). According to the experiments performed by the inventor, a difference between the turning angle to reach the first expanded position and the turning angle to reach the second expanded position is preferably in a range of about 1 degree to 8 degrees. In this embodiment, the angle difference is about 3.45 degrees. Moreover, when the temples 2 are changed from the first expanded position to the second expanded position, a distance (D3) between the terminating ends 232 of the temples 2 is reduced from 80 mm to 67 mm in this embodiment.

In sum, by rotating the adjuster elements 3, the largest turning angles of the temples 2 can be easily adjusted or changed to suit different sizes of the user's heads.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adjustable eyeglasses assembly comprising:
   an eyeglasses frame having two opposite temple connecting parts, each having an abutment face;
   two temples each having a pivot part connected foldably to one of said temple connecting parts, an ear piece, and a recess formed between said pivot part and said ear piece and adjacent to said abutment face; and
   two rotary adjuster elements each disposed movably in said recess of one of said temples, and having first and second end faces that are opposite to each other, each of said adjuster elements being rotatable to selectively move one of said first and second end faces to abut against said abutment face and to thereby limit a turning angle of a respective one of said temples when the respective one of said temples is fully unfolded, said turning angle being changed when said first and second end faces are interchanged for abutment with said abutment face.

2. The adjustable eyeglasses assembly of claim 1, wherein each of said temples is rotatable about a pivot axis of said pivot part, said ear piece of each of said temples having a terminating end, a line passing through said terminating end and said pivot axis being inclined by an angle with respective to a line passing through said pivot axes of said temples, each of said temples being capable of turning to a first expanded position when said first end face abuts against said abutment face and to a second expanded position when said second end face is in abutment with said abutment face, a difference between a turning angle to reach said first expanded position and a turning angle to reach said second expanded position ranging from 1 degree to 8 degrees.

3. The adjustable eyeglasses assembly of claim 1, wherein each of said temples has an inner side adapted to contact a user's head, and an outer side that is opposite to said inner side and that is recessed to form said recess, said recess opening at one side adjacent to said abutment face to permit said one of said adjuster elements to abut against said abutment face.

4. The adjustable eyeglasses assembly of claim 3, wherein said outer side is recessed to form a recess bottom and a recess sidewall that cooperate to define said recess, said recess sidewall facing said abutment face, each of said temples further having a pivot hole extending through said recess bottom and said inner side, each of said adjuster elements being disposed rotatably between said recess sidewall and said abutment face, and having a contact face to contact said recess bottom, and a spindle extending from said contact face into said pivot hole, said first and second end faces being disposed on two opposite sides of said spindle.

5. The adjustable eyeglasses assembly of claim 4, wherein each of said temples further has a releasable interlocking unit between said recess bottom and a respective one of said adjuster elements.

6. The adjustable eyeglasses assembly of claim 5, wherein said interlocking unit includes two locking pieces protruding from said recess bottom on two opposite sides of said pivot hole, each of said adjuster elements further having two locking slots to releasably and respectively interlock with said locking pieces.

7. The adjustable eyeglasses of claim 4, wherein said first and second end faces of each of said adjuster elements are disposed on two opposite sides of an axis of said spindle, said first end face having a first abutment part, said second end face having a second abutment part, a shortest distance of said first abutment part from said axis of said spindle being larger than that of said second abutment part from said axis of said spindle.

* * * * *